INVENTOR
ROBERT VON LINDE

United States Patent Office 3,447,531
Patented June 3, 1969

3,447,531
RADIATION HEATING APPARATUS
Robert von Linde, 56 Akilindastrasse,
Grafelfing, near Munich, Germany
Filed Mar. 14, 1966, Ser. No. 534,000
Claims priority, application Germany, Mar. 16, 1965,
L 50,217; May 26, 1965, L 50,798
Int. Cl. F24c 3/04, 5/00
U.S. Cl. 126—94                                    5 Claims

ABSTRACT OF THE DISCLOSURE

A fluid fuel radiant heater having a reflector between the radiant surface and the auxiliary combustion control devices such as valves, blowers, transformer, flame failure control and combustion air preheater heat exchange device. These devices are further protected by insulation of the heat exchanger, heated combustion air line, and exhaust conduits. The components are arranged within a balanced device for easy lowering from the ceiling and provided with automatically engageable and disengageable couplings for the fuel, exhaust gas, and electric current.

Background of the invention

For heating large spaces such as, for example, the halls of manufacturing plants or outdoor places, frequently infrared radiation heating apparatus are used, which are heated for the most part electrically but recently also by means of gas or oil. The known gas or oil-heated apparatus include a radiation body, for example, a light-weight ceramic plate whose fine canals serve as fuel ducts through which flows the combustible gas-air mixture. The mixture is ignited when leaving these canals or ducts. After a relatively short heating-up period, the ceramic plate glows at the discharge side of the mixture and gives off heat in the form of radiation. These apparatus operate relatively uneconomically since a considerable portion of the combustion energy is lead off unused through the exhaust gases. Additionally, the exhaust gases, especially in case of oil-heated apparatus, soil or dirty the atmosphere, which is disadvantageous in case of installation within enclosed spaces.

Summary of the invention

The present invention is concerned with the aim to creat a radiation heating apparatus having a burner for liquid or gaseous fuels, in which as large as possible a proportion of the combustion heat is transformed into radiation heat and which can be constructed as a self-contained, fully enclosed unit. This aim as well as the underlying problems are solved according to the present invention in that the radiation heating apparatus comprises a heat-radiating surface heated by the burner, which forms a part of an enclosed combustion chamber that is in communication with an air preheater for the combustion air, whereby a reflector is provided to the rear of the heat-radiating surface behind which are arranged the auxiliary and/or control apparatus for the burner, i.e., for example, combustion-air blowers, atomizing-air blowers, ignition transformers, regulating devices for the gas or oil supply, possibly also couplings for the fuel connections, the electric current connections or the gas connections as well as the raising and lowering mechanisms with lowerable apparatus, etc. An apparatus is produced by the proposal in accordance with the present invention, in which the combustion energy is transformed up to 80% into radiation heat and which excels therefore by a very good thermal efficiency. As a result thereof, and by reason of the fact that in the apparatus according to the present invention the radiation heat is supplied in particular to the area close to the floor, a considerable saving in fuel is achieved.

This high efficiency results from the fact that a large proportion of the heat, which otherwise is lost by the exhaust gas, is regained by the preheating of the combustion air and that also the radiation heat is protected against stray losses by the arrangement of the reflector. It is, of course, also known in connection with other heating apparatus, on the one hand, to achieve a higher efficiency by the arrangement of an air preheater and, on the other, to provide a reflector. However, by the novel combination of these two measures in connection with other features of the present invention a novel radiation-heating apparatus is produced by the present invention, which can be designed and constructed for very high outputs, has a high efficiency, does not cause any soiling of the atmosphere in enclosed spaces and permits, by the arrangement of the auxiliary and control apparatus behind the reflector, a combining of the apparatus into a self-contained enclosed unit, which is especially of advantage when such apparatus are to be individually installed at greater heights, for example, on masts or at ceilings of large spaces or halls.

The reflector is preferably arranged between the heat radiating surface and the air preheater in order, on the one hand, to enable as far-reachingly as possible a capture of the heat-radiating in the wrong direction and, on the other, to enable a favorable arrangement behind the reflector of the auxiliary apparatus operatively connected with the air preheater, especially of the blower or fan for the combustion air.

The heat-radiating surface is preferably a part of a radiating pipe structure whereby the air preheater is arranged essentially parallel to this radiating pipe. A particularly compact construction results therefrom as well as the possibility to arrange the burner at one end and the blower or fan for the combustion air at the other end of the apparatus. A certain weight equalization is achieved thereby which is of significance especially with freely suspended apparatus. If the apparatus is intended for installation at greater heights, for example, on hall ceilings or on masts, then it is appropriate to secure the apparatus in a lowerable manner at a support body which, on the one hand, is arranged at the ceiling of the hall or at the mast whereby couplings for the fuel connection, the electric current connection and possibly the exhaust gas connection are provided between the support body and the apparatus, which couplings close these connections automatically during lowering of the apparatus. The servicing of the apparatus is considerably facilitated by this arrangement.

Another aim of the present invention is a radiation-heating pipe structure, especially for radiation-heating apparatus of the type described above, comprising an inner pipe heated by a burner and an external or outer pipe surrounding the inner pipe, which forms together with the inner pipe a flow path for the hot combustion gases. With the known radiation heating pipe structures of this type, the intermediate space between the inner pipe and the outer pipe is traversed over its entire length by the flow of the combustion gases, which has as a consequence a high thermal loading of the inner pipe, especially near the burner nozzle since this pipe is heated over its entire length not only from within by the burner flame but also from the outside thereof by the hot combustion gases. For this reason, such radiation heating pipes are utilized primarily in those fields in which one is more concerned with a closed-off exhaust gas conduction than with a very high heat output, for example, in industrial furnaces. It is further known in connection with such radiation-heating pipes to insert into the inner pipe surrounded by the outer pipe a combustion chamber of its own, which forms together with the inner pipe a cylindrical annular space through which is supplied the combustion air to the combustion chamber. The cooling of the combustion chamber and of the burner, which is achieved thereby, is however obtained only by accepting a complicated construction since, within the area of the burner and of the combustion chamber, three pipes are arranged nested one within the other whose spatial requirements are not inconsiderable altogether.

The present invention is, therefore, also concerned with the further task to create a radiation-heating pipe assembly which excels by a simple construction and nevertheless can be operated with very high heat outputs so that it can also be utilized for heating large spaces, for example, for heating airplane hangers, halls of manufacturing plants or athletic halls, or of outdoor places such as sports' installations, amphitheaters, garden-type restaurants, etc. The radiation-heating pipe assembly according to the present invention is characterized in that the burner is arranged at one end of the outer pipe and that the intermediate space between the inner pipe and the outer pipe is subdivided into two partial spaces by a separating wall extending transversely to the longitudinal direction of the pipes, of which the partial space adjacent the burner serves for supplying and conducting the combustion air and the other partial space for conducting the combustion gases. There is achieved by the construction in accordance with the present invention that both the burner as also the part of the inner pipe, which forms the combustion chamber properly speaking, is cooled by the combustion air to such an extent that a very high burner output is permissive without requiring, as is the case with the known prior art constructions, a combustion chamber formed by a separate pipe.

The outer pipe preferably consists of two pipe pieces which are connected with each other by a flange forming a separating wall because there exists then the possibility to utilize for the pipe piece defining the flow path for the combustion air, which is loaded thermally only slightly, i.e., to a lesser extent, a less expensive material, for example, carbon steel than for the pipe piece defining the flow path for the combustion gases which consists preferably of a high-alloy chrome-nickel steel. The aforementioned flange may also serve simultaneously as spacer between the inner and outer pipes. The pipe pieces forming the outer pipe have as much as possible identical external diameters in order that the impression of a continuous pipe is achieved.

Preferably the burner is inserted sealingly into the free end of the outer pipe whereby the burner mouthpiece extends into the inner pipe. The closure of the annular space guiding the combustion air is achieved thereby in a simple manner. Since the inner pipe, by reason of being heated to relatively high temperature, expands considerably more than the outer pipe within the area of the combustion air conduction, it is appropriate to insert the burner into the outer pipe so as to be axially displaceable.

The supply of the combustion air to the aforementioned annular space takes place preferably tangentially in order to achieve within this annular space a spirally shaped air flow about the inner pipe. The air inlet connection is thereby arranged near the aforementioned separating wall.

The inner pipe is formed preferably of part-cylindrical shells whose longitudinal edges are flanged over outwardly and are welded to each other. A considerable mechanical reinforcement of the pipe is achieved by these flanged-over edges, whereby the use of sheet metal parts of relatively slight wall thickness is made possible. These flanged over edges may serve simultaneously as spacer supports between the inner pipe and the outer pipe. Especially when the outer pipe is composed of two pipe pieces, it is appropriate to contsruct also that pipe piece which forms the flow path for the combustion gases in the aforementioned manner of partial cylindrical shells having outwardly flanged over longitudinal edges welded to one another.

Accordingly, it is an object of the present invention to provide a radiation-heating apparatus of the type described above which eliminates by extremely simple means the shortcomings and drawbacks encountered with the prior art constructions.

Another object of the present invention resides in a radiation-heating apparatus which operates relatively efficiently by utilizing as much of the combustion energy as possible.

A further object of the present invention resides in a radiation-heating apparatus which is so constructed as to permit heating thereof by means of oil or the like without danger of soiling the atmosphere, a factor important particularly in the installation thereof in enclosed spaces.

A still further object of the present invention resides in a radiation-heating apparatus having a fluid-fuel burner in which as large as possible a proportion of the combustion heat is transformed into radiation heat.

Still another object of the present invention resides in a radiation heating apparatus which is of extremely simple construction in the form of a self-contained unit.

Another object of the present invention is the provision of a radiation-heating apparatus which is characterized by extraordinarily good thermal efficiency resulting in fuel economy.

A further object of the present invention resides in a radiation-heating apparatus which can be constructed for very high outputs without danger of damage due to excessive heat loads and stresses.

Still another object of the present invention resides in a radiation-heating apparatus which may be raised and lowered as a unit thereby facilitating its installation in ceilings and the like as well as servicing thereof.

Another object of the present invention resides in a radiation-heating installation which eliminates to the greatest possible extent heat losses due to radiation in the undesired directions.

A further object of the present invention is a unitary radiation-heating apparatus which offers at least a certain weight balance to facilitate suspension thereof on ceilings and the like.

Another object of the present invention resides in a radiation-heating apparatus which can be readily serviced without complicated removal operations.

Still another object of the present invention resides in a radiation-heating apparatus in which the heating pipes together with the associated burner are of simple construction, permitting operation with very high outputs.

*Brief description of the drawing*

These and further objects, features, and advantages of the present invention will become more obvious from the following description when taken in connection with the accompanying drawing which shows, for purposes of illustration only, several embodiments in accordance with the present invention, and wherein.

*Detailed description of the drawing*

Figure 1:
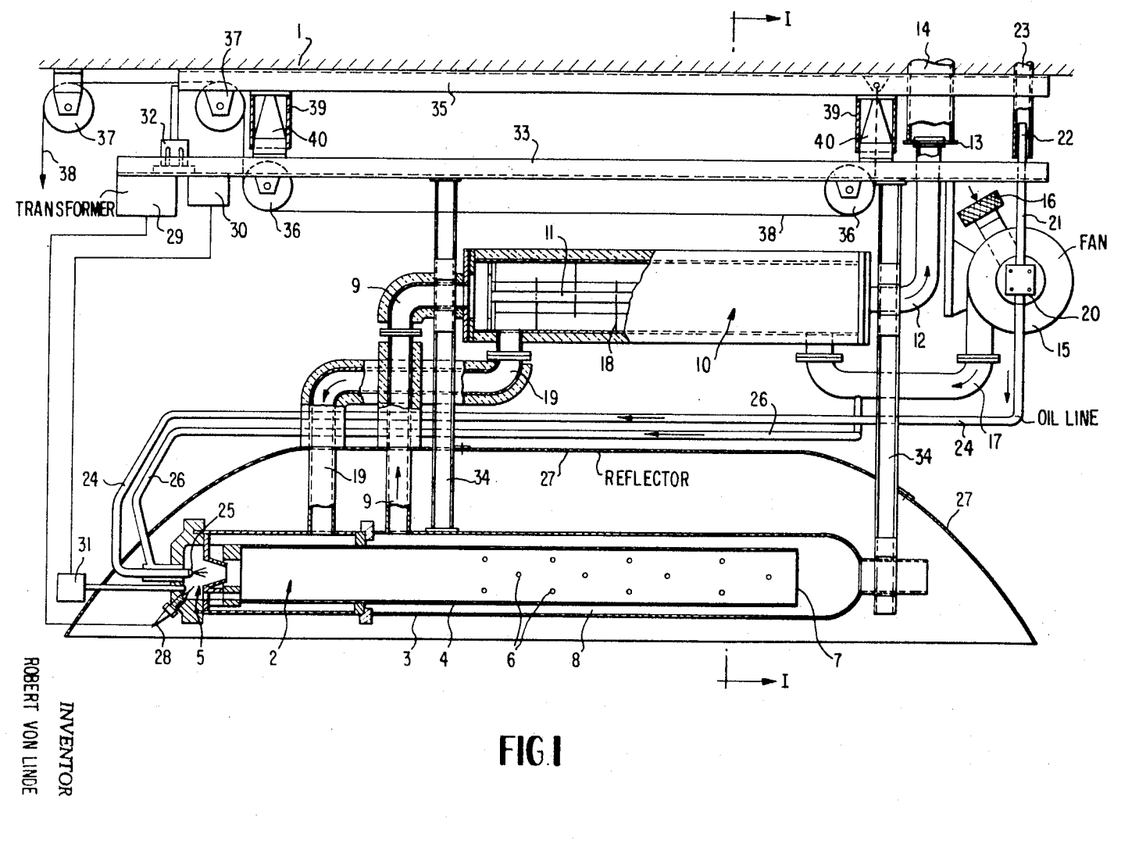
FIGURE 1 is a somewhat schematic view of a radiation-heating apparatus in accordance with the present invention provided with an oil-heated radiation pipe burner, partly in cross section.
Figure 2:
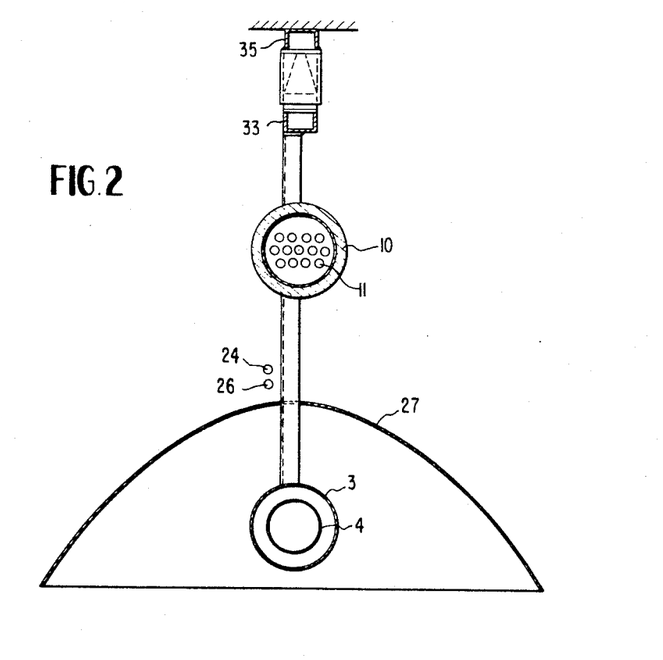
FIGURE 2 is a cross-sectional view taken along line II—II of FIGURE 1.

Referring now to the drawing wherein like reference numerals are used throughout the various views to designate like parts, and more particularly to FIGURES 1 and 2, the radiation-heating apparatus illustrated therein is intended for a lowerable installation at the ceiling 1 of a hall or other large space. The radiation-heating apparatus comprises a radiation pipe burner assembly generally designated by reference numeral 2 which consists of a radiation pipe 3, of an inner pipe 4, and of an oil burner generally designated by reference numeral 5. The hot exhaust gases flow through the inner pipe 4 and reach, partly through the apertures 6 and partly through the open end 7 of the inner pipe 4, the intermediate space 8 between the inner pipe 4 and the radiation pipe 3 and thus heat the radiation pipe 3 to glow temperatures thereof. After flowing through the intermediate space 8, the exhaust gases reach by way of a line 9 the air preheater generally designated by reference numeral 10 which is equipped with a number of longitudinally extending pipes 11. The exhaust gases flow through these pipes 11 and leave by way of a line 12 which is connected with an exhaust pipe 14 arranged in the ceiling 1 by way of a plug-in-type coupling 13. The combustion air is sucked in by means of a blower 15 by way of a filter 16 and is supplied to the air preheater 10 by way of a line 17. The combusion air flows, constrained by the deflection plates 18, through the preheater 10 along a zigzag shaped path and reaches the oil burner 5 by way of the line 19. The oil is sucked out of a level vessel, i.e., for example, at the level of the floor, by the pump 20 by way of a line 21, a plug-type coupling 22 and a line 23 and is supplied to the burner nozzle 25 by way of the line 24. Reference numeral 26 designates a line through which cooling air is branched off from the line 17 and is supplied to the burner nozzle 25, which is of particular significance in this case because the otherwise present normal cooling of the nozzle by the combustion air is lacking by reason of the pre-heating of the combustion air and also the immediate surrounding of the oil burner can assume a very high temperature by reason of the presence of the reflector 27. This reflector 27 extends over the entire length of the radiation pipe burner 2 between the latter and the air preheater 10.

Reference numeral 28 designates an ignition device of conventional construction which is fed from an ignition transformer 29. For purposes of supervising and piloting the burner, a conventional flame-sensing means 30 including a photocell 31 is provided in the usual manner. The current supply takes place by way of a plug-type connector 32.

All individual parts of the apparatus are either directly or indirectly secured at an apparatus bearer or support 33, from which extend the struts 34 to which are secured the air preheater 10, the reflector 27 and the radiation pipe burner 2. The blower 15 together with the oil pump 20, the ignition transformer 29, and the flame-sensing device 30 are secured directly at the apparatus bearer 33. These auxiliary apparatus inclusive the photocell 31 are, as clearly visible from the drawing, arranged behind the reflector 27 so that they are protected from the extraordinarily intensive heat radiation of the radiation pipe 3. For the same reasons the lines 9 and 19 conducting the hot exhaust gases and the pre-heated combustion air as well as the air preheater 10 are heat-insulated in the sections thereof flying to the rear of the reflector 27.

The apparatus bearer or support 33 is installed on a bearer or support body 35 secured in a lowerable manner at the ceiling by means of a cable 38 extending over rollers 36 and 37. For purposes of centering the apparatus bearer 33 at the support body 35, which is necessary in order to assure a completely satisfactory cooperation of the parts of the plug-type couplings 13 and 22 and of the connector 32, two pipe-connecting pieces 39 are mounted on the support body 35 into which engage the guide pins 40 which are secured at the apparatus bearer 33 and which extend conically in the upward direction in order to facilitate the insertion thereof into the pipe-connecting pieces 39.

Figure 3:
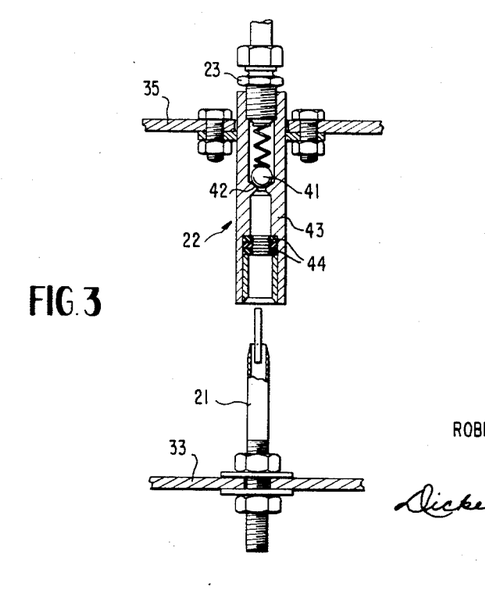
FIGURE 3 is a partial cross-sectional view, on an enlarged scale, illustrating certain details of FIGURE 1.

In case of repairs or servicing operations, the apparatus bearer 33 together with the complete radiation heating apparatus can be lowered by means of the cable 38 whereby the plug-type couplings 13, 22, and 32 are automatically disengaged and the current and oil supplies are interrupted. The coupling for the oil supply is illustrated in cross section in FIGURE 3. It includes a spring-loaded ball valve 41 which closes off the oil supply with the apparatus lowered and which is lifted off its valve seat 42 by the end of the line 21 with the apparatus in the operating position. The pipe 21 is sealed off in the coupling body 43 by the sealing rings 44.

As readily visible in the drawing, as a result of the selected guidance of the combustion air and of the exhaust gases, the oil burner 5 is located at one end and the blower 15 for the combustion air at the other end of the apparatus. As a result thereof, a weight-balancing is achieved which is of considerable significance and importance for the stability of the apparatus during lowering thereof.

Figure 4:
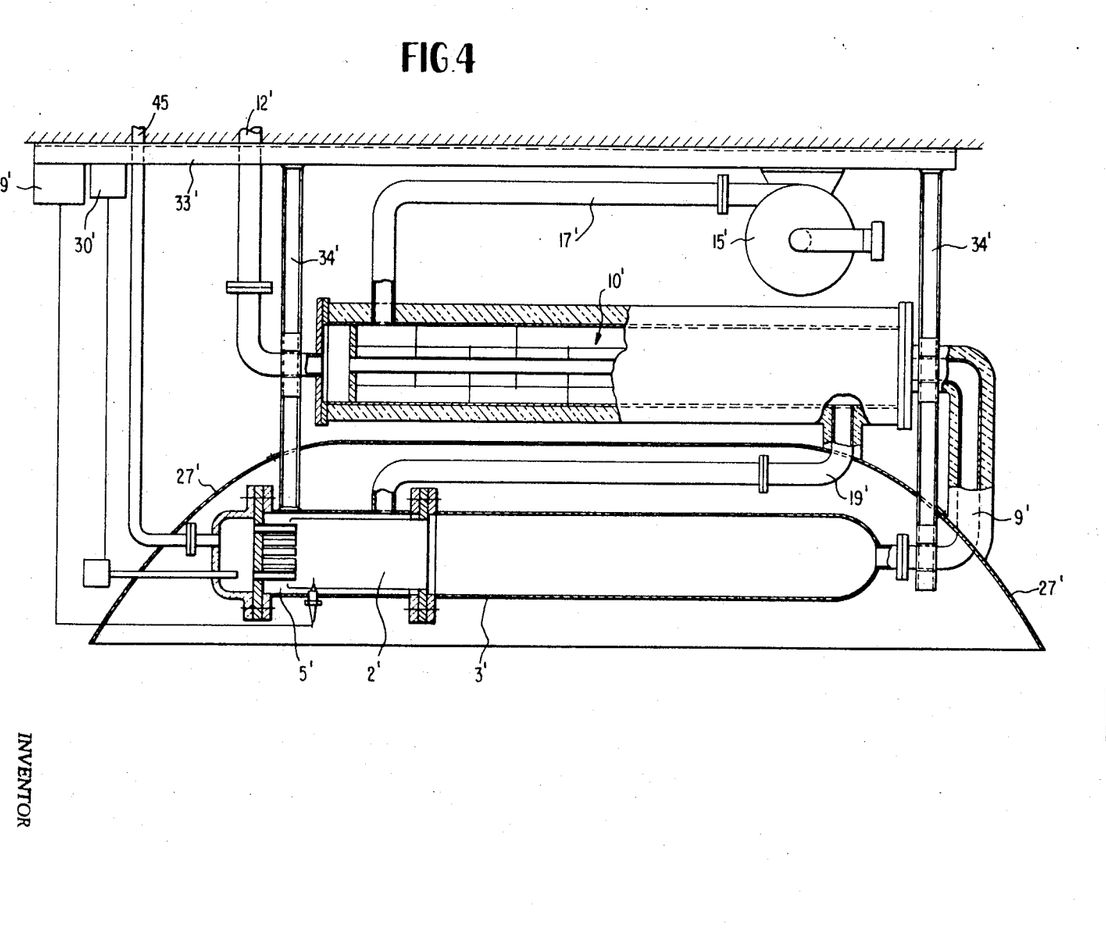
FIGURE 4 is a somewhat schematic view of a modified embodiment of a radiation heating apparatus, in accordance with the present invention, similar to that of FIGURE 1 but having a gas-heated radiation pipe burner.

The radiation-heating apparatus illustrated in FIGURE 4 is operated with gas and is secured at a predetermined place in a non-lowerable manner. It consists essentially of an apparatus bearer 33', from which extend the struts 34' on which are secured the air preheater 10', the reflector 27' and the radiation pipe burner 2'. The blower 15' for the combustion air as well as the ignition transformer 29' and the flame-sensing device 30' are arranged directly at the apparatus bearer 33'. The burner gas is supplied to the gas burner 5' by way of a line 45. The hot exhaust gases heat up the radiation pipe 3' and reach by way of the line 9' the air preheater 10' from which they are lead off by way of the line 12'. The combustion air reaches by way of the line 17' the air preheater 10', flows through the same in the counter-current principle and is supplied to the gas burner 5' by way of the line 19'. Also in this embodiment all auxiliary apparatus are arranged behind the reflector 27' and all line sections, which conduct hot exhaust gases or preheated combustion air disposed to the rear of the reflector 27' are heat insulated.

Figure 5:
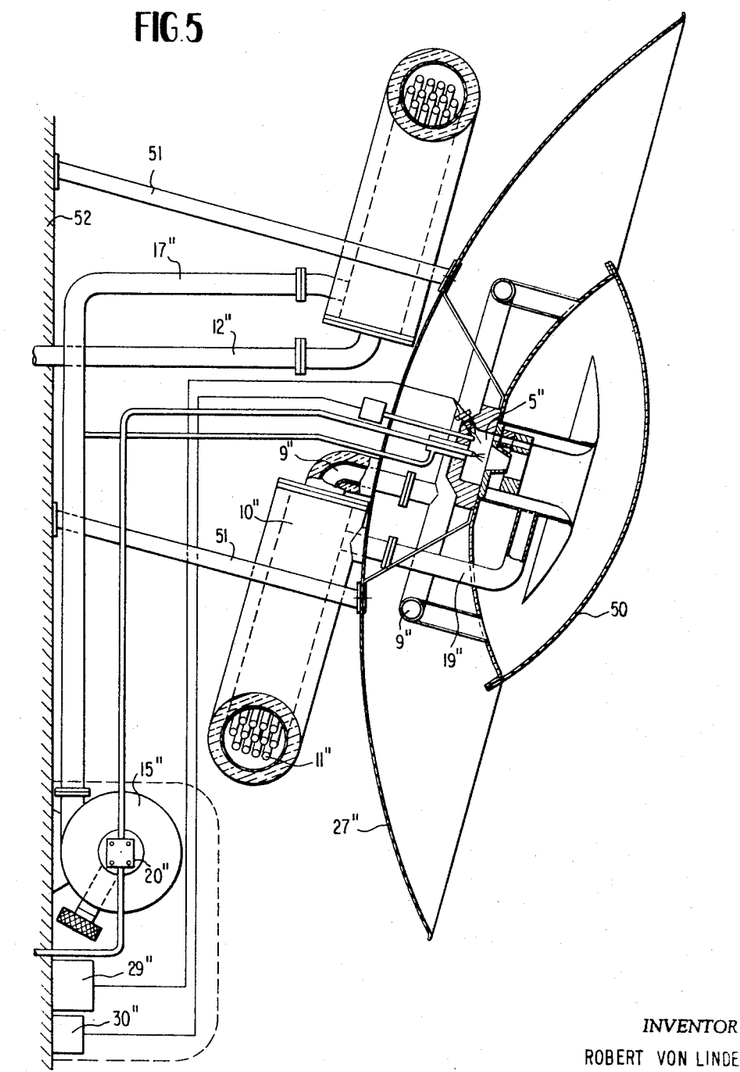
FIGURE 5 is a somewhat schematic view of a still further modified embodiment of a radiation-heating apparatus in accordance with the present invention provided with an oil-heated mushroom-shaped burner.

The embodiment according to FIGURE 5 illustrates a fixedly mounted radiation-heating apparatus which is provided with an oil-heated, mushroom-shaped burner. The heat-radiating surface is constructed in the form of a mushroom 50 and is heated by an oil burner 5". The exhaust gases reach an air preheater 10" by way of a line 9", flow through the inner pipe 11" thereof and are lead off by way of the line 12". The combustion air is sucked in by a blower 15", is supplied to the air preheater 10" by way of the line 17" and reaches the burner 5" by way of the line 19". Reference numeral 29" designates the ignition transformer, reference numeral 30" the flame-sensing device and reference numeral 20" the oil pump. All of these auxiliary apparatus inclusive the blower 15" are arranged essentially behind the parabolically shaped reflector 27" which, like the air preheater 10" and the burner 5" together with the mushroom-shaped radiating body 50 is secured by means of struts 51, for example, at a wall 52, of the space to be heated.

Figure 6:
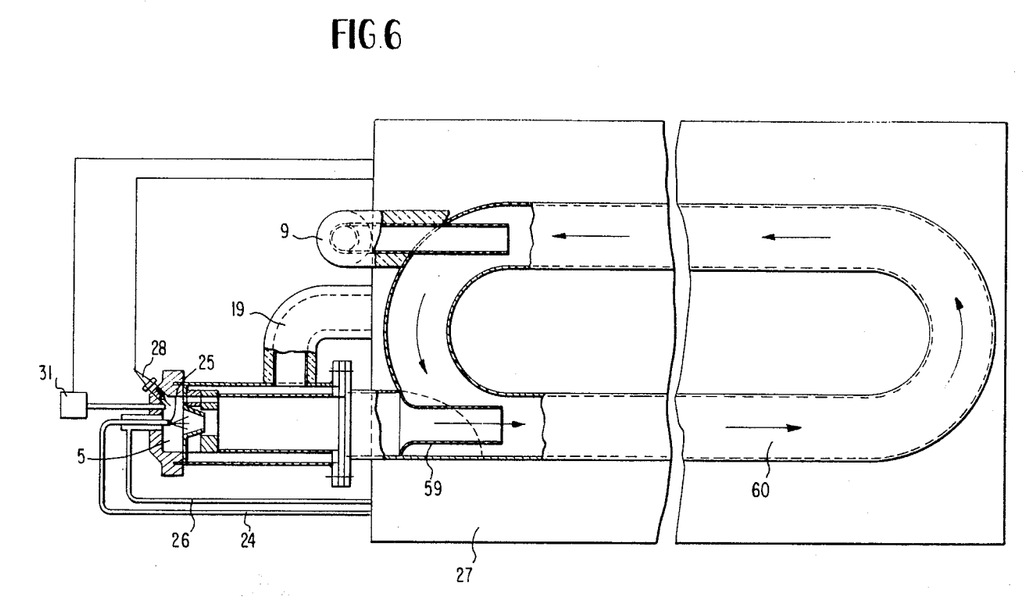
FIGURE 6 is a schematic bottom plan view of still another modified embodiment of a radiation heating apparatus, in accordance with the present invention, similar to FIGURE 1 and provided with an oil-heated O-type burner.

The embodiment according to FIGURE 6 differs from that of FIGURE 1 essentially only that instead of the rectilinearly extending radiation pipe assembly 3 a so-called O-type pipe structure 60 is used. With such O-pipes a uniform heating is achieved in that the hot gases suck exhaust gases through a nozzle 59 in an injector-like manner out of the pipe and thus cause a larger quantity of hot gases to circulate in the direction of the arrows. FIGURE 6 illustrates the apparatus in bottom plan view. The air preheater and the auxiliary and control apparatus are disposed behind the reflector 27 and therefore are not visible in this figure.

Figure 7:
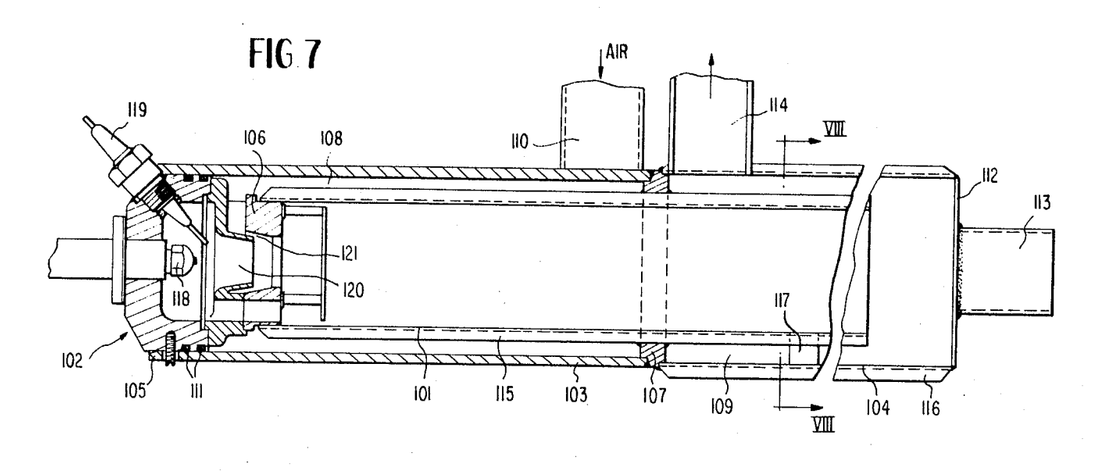
FIGURE 7 is an elevational view, partly in longitudinal cross section, of a preferred radiation-heating pipe assembly in accordance with the present invention.
Figure 8:
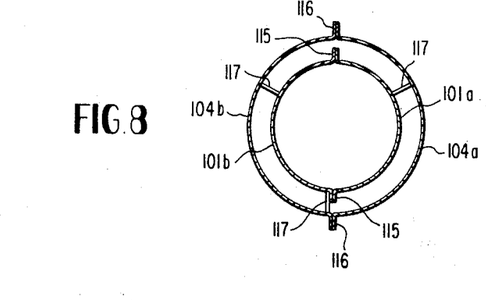
FIGURE 8 is a cross-sectional view, taken along line VIII-VIII of FIGURE 7.

The radiation heating pipe assembly illustrated in FIGURES 7 and 8 essentially consists of an inner pipe 101 which is heated by means of a burner, for example, an oil burner generally designated by reference numeral 102 and which is surrounded by an outer pipe composed of two pipe pieces 103 and 104. The burner 102 is inserted axially displaceably into the free end 105 of the outer pipe piece 103 and extends with its mouthpiece 106 into the inner pipe 101. The pipe pieces 103 and 104 are connected with each other by means of a flange 107 which is welded to the inner pipe 101 and subdivides the annular space between the inner pipe 101 and the outer pipe constituted by the pipe pieces 103 and 104 into two partial spaces 108 and 109. The partial space 108 serves for the guidance of the combustion air to the burner 102. For this purpose, an air inlet connection 110 terminates in the annular space 108 near the flange 107. The introduction of the air into the annular space 108 takes place tangentially in order to achieve a spirally shaped air flow about the inner pipe 101 within the space 108 in the direction toward the burner 102 and therewith a good cooling of that part of the inner pipe 101 heated most strongly by the burner flame. The sealing of the annular space 108 at the end opposite the flange 107 takes place with the aid of sealing rings 111 which are arranged between the burner 102 and the pipe piece 103.

The outer pipe piece 104 is closed off at the end opposite the flange 107 by means of a welded-on cover or lid 112 which carries a securing or mounting connection 113. The inner pipe 101 terminates, as clearly visible from the drawing, in front of the cover 112 so that the hot combustion gases are able to flow out of the inner pipe 101 into the annular space 109 and from there are lead off by way of the outlet connection 114 arranged near the flange 107.

As can be seen particularly well from FIGURE 8, the inner pipe 101 and the outer pipe piece 104 are composed each of two semi-cylindrical shells 101a, 101b, and 104a and 104b, respectively, whose longitudinal edges 115 and 116 are flanged over outwardly and are welded together. A considerable mechanical reinforcement of this pipe is achieved thereby which enables the use of sheet metal parts having relatively small wall thickness. The flanged-over edges 115 of the inner pipe 101 may be constructed thereby at the same time as spacer supports between the inner pipe 101 and the outer pipe pieces 103 and 104 in that they are extended up to the inner circumference of the outer pipe piece. In the illustrated embodiment, maintaining the spacing is realized by the burner mouthpiece 106, the flange 107, and the spacer supports 117.

The outer pipe piece 103 is thermally loaded to a considerably lesser extent than the inner pipe 101 and the outer pipe piece 104. Consequently, it may consist of a less expensive material. Since it serves as bearer for the burner 102, it has a greater wall thickness than the outer pipe piece 104.

The burner 102 is a high-pressure atomizing burner which is provided with a burner nozzle 118, an ignition device 119 and a mixing nozzle 120. The combustion air supplied by way of the connection 110 and the annular space 108 flows through the annular gap 121 of the mixing nozzle 120 into the inner pipe 101. By reason of the fact that the parts of the inner pipe 101 adjacent the burner 102 are cooled by the combustion air, very high burner outputs are permissible. Thus, with apparatus constructed according to the present invention, one may operate with burner space loads of 60,000,000 kcal./m.$^3$ whereby a surface load of 12 kcal./cm.$^2$ occurs on the outer pipe piece 104.

While I have shown and described several embodiments in accordance with the present invention, it is understood that the same is not limited thereto but is susceptible of numerous changes and modifications as known to a person skilled in the art. For example, the outer pipe of the embodiment of FIGURES 7 and 8 may also be constituted by a unitary continuous pipe. Furthermore, the inner pipe 101 and the outer pipe piece 104 may each be constituted by more than two partial cylindrical shells.

Thus, it is obvious that the present invention is not limited to the details shown and described herein, and I therefore, do not wish to be limited thereto but intend to cover all such changes and modifications as are encompassed by the scope of the appended claims.

I claim:

1. A heater assembly, comprising: a generally horizontal planar bearer member carrying horizontally displaced depending support struts; a radiant heating apparatus; spaced pulley means adapted to cooperate with hoist means to raise and lower said heating apparatus with respect to an overhead stationary support; spaced pairs of cooperating guide sleeve members and guide lug members, one guide member of each pair being adapted to be mounted on the stationary support and the other guide member of each pair being securely connected to said bearer member; spaced fuel and exhaust gas line coupling means and electrical coupling means carried by said bearer member and all adapted to cooperate with corresponding coupling means located on the stationary support; said heating apparatus including a horizontally elongated heat radiating body including a burner and a combustion chamber, a radiation reflector positioned between said heat radiating body and said support bearer, a heat exchanger for preheating the combustion air positioned between said heat radiating body and said bearer member, first tubular means fluid interconnecting said exhaust gas line coupling means with said heat exchanger and said heat radiating body, second tubular means fluid interconnecting said fuel line coupling means with said heat radiating body, third combustion air tubular means fluid interconnecting said heat exchanger and said heat radiating body, auxiliary means for controlling the operation of said burner apparatus, arranged between said reflector and said bearer member, and line means electrically connecting said electrical coupling means with said auxiliary means.

2. The combination according to claim 1, wherein said heat radiating body, said reflector and said heat exchanger are symmetrical with respect to a vertical plane passing through the geometric center of said bearer.

3. The combination according to claim 1, further comprising blower means for the combustion air directly rigidly connected to said apparatus bearer at the end of the apparatus bearer opposite the burner means.

4. The combination according to claim 1, wherein said burner includes an air-cooled fuel nozzle and additional tubular means bypassing said heat exchanger and supplying a relatively minor portion of the combustion air directly to said nozzle for cooling the nozzle; said heat radiating body including an inner pipe forming the combustion chamber, an outer pipe concentrically surrounding the inner pipe and providing an intermediate annular space partially forming said first tubular means.

5. The combination of claim 4, wherein said heat radiation body, said reflector and said heat exchanger are symmetrical with respect to a vertical plane passing through the geometric center of said bearer; blower means for the combustion air directly rigidly connected to said apparatus bearer at the end of the apparatus bearer opposite the burner means.

References Cited

UNITED STATES PATENTS

| | | | |
|---|---|---|---|
| 2,391,447 | 12/1945 | Edge. | |
| 2,576,228 | 11/1951 | Kinnaird | 23—277 |
| 2,602,440 | 7/1952 | Corns. | |
| 2,603,064 | 7/1952 | Williams. | |
| 2,628,850 | 2/1953 | Summerville | 251—149.7 |
| 2,768,641 | 10/1956 | Rycroft | 251—149.7 |
| 2,870,829 | 1/1959 | Williams | 158—113 |
| 2,946,510 | 7/1960 | Galvin. | |
| 3,066,727 | 12/1962 | Galvin. | |
| 3,279,455 | 10/1966 | Corey. | |
| 2,759,472 | 8/1956 | Cartter | 126—91 |

FOREIGN PATENTS

| | | |
|---|---|---|
| 124,701 | 7/1947 | Australia. |
| 35,428 | 12/1908 | Austria. |
| 267,937 | 12/1913 | Germany. |
| 1,193,191 | 5/1965 | Germany. |
| 779,669 | 7/1957 | Great Britain. |

OTHER REFERENCES

Perfection Heater Manual, pp. 1–662 and 2–662, Perfection Division, Hupp Corp., Cleveland, Ohio, Published 1962.

FREDERICK KETTERER, *Primary Examiner.*

U.S. Cl. X.R.

126—92